April 29, 1947.  H. CRUZAN ET AL  2,419,630
THERMOSTATIC SURGE VALVE
Filed Jan. 7, 1943
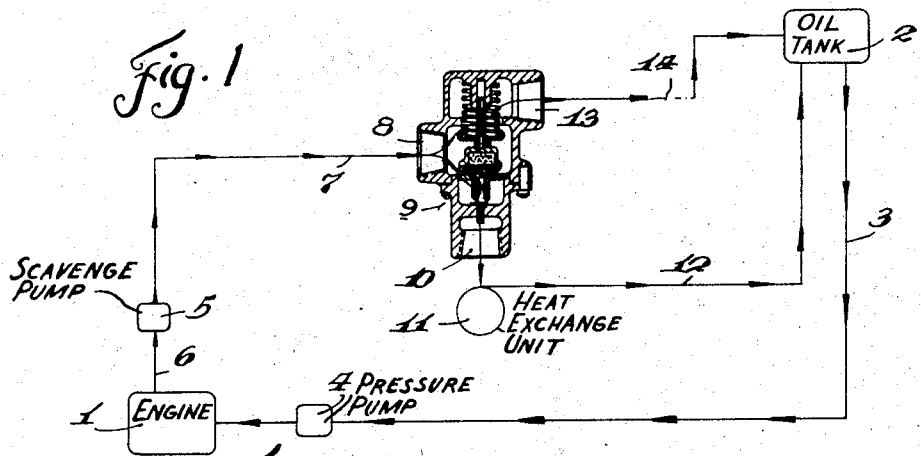
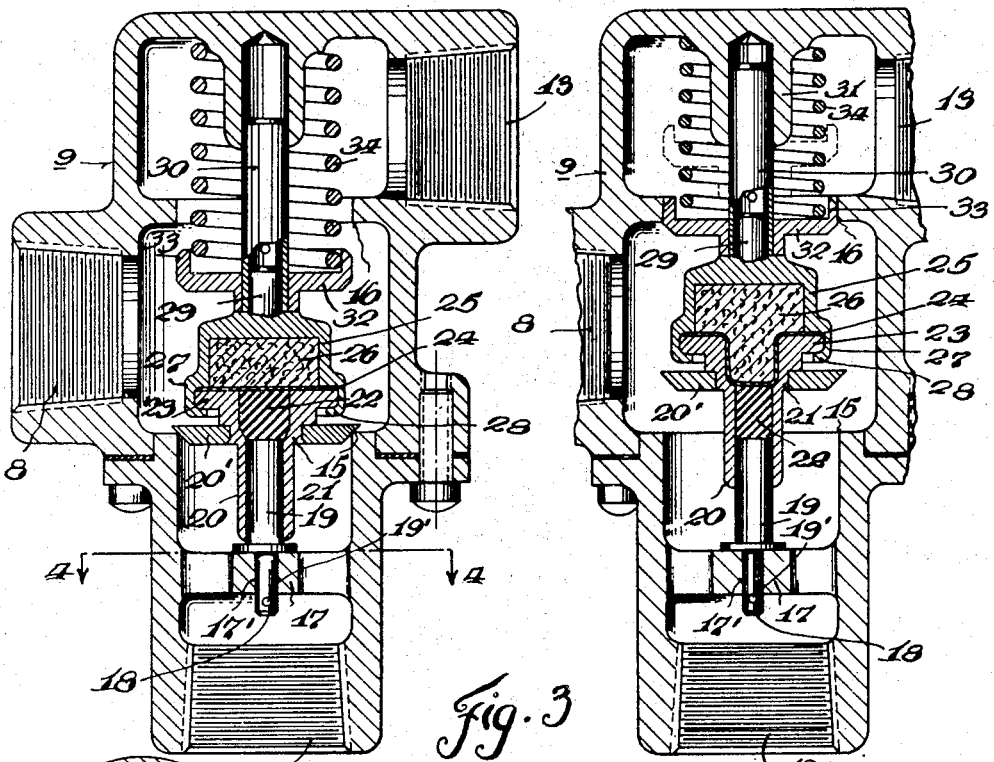
Harold Cruzan
Edward C. Warrick
INVENTORS
BY
C. A. Stevens
ATTORNEY.

Patented Apr. 29, 1947

2,419,630

UNITED STATES PATENT OFFICE 2,419,630

THERMOSTATIC SURGE VALVE

Harold Cruzan and Edward C. Warrick, Dayton, Ohio, assignors to United Aircraft Products, Inc., Dayton, Ohio, a corporation of Ohio Application January 7, 1943, Serial No. 471,601

5 Claims. (Cl. 236—34)

This invention relates to a thermostatic by-pass control valve and pertains more particularly to a device for controlling the surge pressure in a fluid circulatory system, wherein a lubricant is circulated under pressure through a heat exchanger or temperature and viscosity conditioning unit by a pump or analogous pressure producing means.

While the thermostatic by-pass control valve forming the subject matter of the present invention is hereinafter shown and described as being applied to a lubricant circulating and conditioning system of an aircraft engine, it is to be particularly noted that same is not restricted to such specific use, but is applicable to power units used in connection with all other types of motor vehicles or with any and all types of fluid circulatory systems wherein a similar problem is involved.

At the present time, the lubricant circulating and conditioning systems as used in aircraft engines generally include a pressure or scavenge pump disposed in the conduit leading from the engine back to the reservoir. In order that the heat exchange unit may function to properly control the temperature and thereby the viscosity of the oil being returned to the reservoir, the same is installed in the return conduit between the scavenge pump and reservoir.

Ordinarily, during the initial starting of the engine, and particularly during low temperature conditions, the lubricant in the various conduits, heat exchange unit and other parts of the system is more viscous than desired for efficient operation. Under such circumstances, high pressure is required to force the lubricant through the various conduits, the heat exchange unit, and to the vital parts of the engine which require uniform and constant lubrication. From the foregoing it will be appreciated that an almost instantaneous high pressure will be built up immediately upon starting the engine and scavenge pump, which action results in serious damage to the system and heat exchange unit by bulging or collapsing the shell and/or tubes of the latter and possible rupturing of the lines.

It is therefore the primary important object of this invention to provide a device of the above character which will entirely eliminate the possibility of excessive or surge pressure, generated by the scavenge pump, being exerted on the heat exchange unit so as to protect the latter from damage which may result from such excessive or surge pressure.

Another important object of this invention is to provide a thermostatic control or by-pass valve of the above character which is entirely automatic in operation and one which will prevent damage to the lubricating system resulting from excessive pressure built up by the scavenge pump under actual flight conditions, for example, in situations where the motor and lubricating system is temporarily cut out or is unoperative, during power dives at high altitudes and then restored immediately to high speed. These conditions usually result in rapidly increasing the viscosity of the lubricant and in most instances congealing the latter.

Another important object of this invention is to provide a thermostatic fluid control valve of the above character by which the lubricant flow through or around the heat exchange unit is controlled by thermal changes therein and which will automatically function to protect the heat exchange unit in the event of any obstruction occurring in the circulatory system whether due to the congealed condition of the lubricant or from any other cause.

Another important object of this invention is to provide a control valve of the above character which will automatically function to by-pass the lubricant around the heat exchange unit directly to the reservoir in the event the viscosity of the lubricant is such that same will not readily flow through the coolant passages under pressure normally generated by the scavenge pump.

Another important object of this invention is to provide a control valve of the above character which will automatically function to by-pass the lubricant around the heat exchange unit and to the reservoir in the event that the flow path is obstructed.

A still further important object of this invention is to provide a by-pass control valve which is of simple construction, easily installed, efficient in operation, and one which may be readily manufactured and placed upon the market at a reasonable cost.

The foregoing and other important objects and advantages will be readily apparent throughout the course of the following detailed description and drawings wherein like reference characters indicate like parts, and in which:

Figure 1 is a diagrammatic plan of a lubricant circulatory system with the thermostatic by-pass control valve forming the subject matter of this invention, shown in vertical section, the latter also being shown in conjunction with a heat exchange unit of the general type disclosed in the patent to R. G. Dykeman, et al., No. 1,864,052, issued June 21, 1932, or of the jacketless type shown and described in our co-pending application, Serial No. 455,820, now Patent No. 2,406,203 dated August 20, 1946.

Figure 2 is a vertical section of the thermostatic by-pass control valve with the conduit leading to the heat exchange unit closed and with the by-pass conduit open, Figure 3 is a fragmentary vertical section through the control valve, similar to Figure 2, with the conduit leading to the heat exchange unit open and with the by-pass conduit closed, the valve controlling the by-pass conduit being further shown in dotted line-position to indicate the movement thereof in the event that sudden surge pressure occurs in the system, and Figure 4 is a horizontal section taken on line 4—4 of Figure 2.

Referring in detail to the drawings and more particularly to Figure 1 thereof, 1 indicates an internal combustion engine or other suitable power plant, to which a lubricant reservoir 2 is connected by means of conduit 3 and in which latter is installed a pump 4 for withdrawing lubricant from the reservoir, and forcing the same into the engine. A scavenge pump 5 is connected to the engine by means of conduit 6 for withdrawing lubricant from the latter and forcing same by way of conduit 7 through inlet 8 of the by-pass control valve 9 forming the subject matter of this invention. The lubricant, dependent upon its viscosity and consequently its temperature, is then forced to the reservoir 2 through main outlet 10, through heat exchange unit 11, and conduit 12 during one phase in the operation and/or through by-pass outlet 13 and conduit 14 to the reservoir 2 in another phase of the operation thereof.

As above noted, the by-pass control valve 9 includes a hollow body or casing provided with an inlet port 8, main outlet port 10 and by-pass outlet 13. The passage connecting the inlet 8 and main outlet 10 is provided with a valve seat 15 while the passage connecting the inlet and by-pass outlet 13 is provided with a valve seat 16.

The passage leading to the main outlet 10 below the valve seat is further provided with a spider 17 formed with an axial opening 17', therethrough to receive the reduced lower end 18 of an axially extending guide member 19, the upper free end of which latter terminates a slight distance below the valve seat 15. The guide member 19 is held against vertical movement relative to the spider by means of a transverse pin 19', or other suitable fastening means.

Mounted for sliding movement upon the guide 19 is a sleeve 20, carrying a valve 20' for engagement with the seat 15. The bore of the sleeve 20 adjacent the upper end thereof is slightly enlarged as shown at 21 to receive any suitable deformable, but non-compressible substance 22. The end of the sleeve 20 adjacent the enlarged bore 21 is formed with an enlarged head or outwardly extending flange portion 23 to provide a support for a diaphragm 24.

An inverted cup-like member 25 containing a thermal-reactive material 26 is formed with an abutment or seat 27 adapted to engage the diaphragm 24 and is further formed with a downwardly extending lip portion beneath the head or flange 23 to confine the thermal-reactive material within the cup-like member and to securely fasten the diaphragm upon the upper end of the sleeve member 20.

Rising vertically from and formed integral with the cup-like member 25 is a stem 29 over which is secured, as by a press-fit or other suitable means, a guide sleeve 30.

The hollow body member 9 is formed with a dependent sleeve 31 in axial alignment with the sleeve 30 and into which the latter extends for sliding movement.

Mounted upon the guide sleeve 30 is a vertically slidable plug valve 32, whose peripheral face is adapted to engage with the valve seat 16 for closing off the passage between the inlet 8 and the by-pass outlet 13.

The valve 32 is normally held engaged with the cup-like member 25 by means of a spring 34, the upper end of which latter is centered about the depending sleeve 31, while the lower end engages the upper face of the valve 33, so as to normally bias the latter away from its seat 16.

In the operation of the surge valve, assuming that the lubricant in the circulatory system is congealed or in a highly viscous condition, the parts of the by-pass control valve are in the position shown in Figure 2. Lubricant under pressure from the scavenge pump 5 enters the inlet 8 and exerts a downward pressure upon the valve 15 to thereby augment the downward pressure of the spring 34 and the thermo-reactive material 26 to hold the valve 20' upon its seat. With the valve 20' in its closed position, the lubricant under pressure from the scavenge pump is by-passed around the heat exchange unit 11 through conduit 14 to the reservoir 2, thence through conduit 3, pressure pump 4 and into engine 1 and from which latter point the cycle of circulation of the lubricant is repeated.

As lubricant is recirculated through the engine, the viscosity thereof is decreased and the temperature thereof increased. As the temperature of the oil increases the heat therefrom is transferred through the cup-like member 25 to the thermo-reactive material 26 which expands and flows in a downward direction to exert a pressure upon the upper end of the guide rod 19. This action results in raising the valves 20' and 32 to the position shown in full lines of Figure 3, at which time the oil is then directed through the main outlet 10 to the heat exchanger 11 through conduit 12 and into the reservoir 2 and thence through conduit 3, pump 4, and back to the engine.

It is to be further particularly noted that the strength of the spring 34 is of such predetermined rate or value that a safe pressure can be maintained on the heat exchange unit for the thaw-out period. When the heat exchange unit has been sufficiently thawed out so that the pressure differential thereacross is less than the pressure exerted by spring 34 on the valve 32, the latter will move to its seated position, as shown in full lines in Figure 3, thus restricting or stopping the flow of lubricant through the by-pass outlet 13, to cause the lubricant to flow through the main outlet 10 to the heat exchange unit.

In the event that a sudden increase and/or surge of pressure occurs, due to the congealing of the cooler, with a corresponding increase in pressure differential between the inlet and the by-pass the valve 32 will be moved past the seat 16 to the position shown in dotted lines in Figure 2 to thus by-pass the lubricant through conduit 13 to reservoir 2. At this point it is to be noted that the biasing of the spring 34 is such that under normal operating conditions the thermostat will raise and hold the valve 33 in the position shown in full lines in Figure 3 and that said valve is only moved to the dotted line position when excessive or surge pressure occurs in the system.

It will be seen from the foregoing that the heat exchange unit will be protected at all times regardless of atmospheric conditions or changes and that the lubricant can only flow through the main outlet 10 to the heat exchange unit 11 when the same has attained a predetermined viscosity and temperature.

It is to be understood that the form of the invention herein shown and described is to be taken as a preferred example of the invention and that various changes in the shape, size and arrangement of parts may be resorted to without departing from the spirit of the invention or the scope of the subjoined claims.

We claim:

1. In a fluid control valve, a body having an inlet chamber, ports in said chamber serving respectively as main and by-pass outlets from said chamber, relatively movable first and second valves respectively controlling said main and by-pass outlets, said second valve being movable into said by-pass outlet to effect closure thereof, yielding means tending normally to hold said first valve closed and said second valve in open position out of said by-pass outlet, and means responsive to a change in the condition of the fluid entering said chamber to open said first valve and to move said second valve to closed position in said by-pass outlet, said second valve being movable through and beyond said by-pass outlet to open said by-pass outlet in response to a pressure increase in said chamber irrespective of the condition of the fluid.

2. In a fluid control valve, a body having an inlet chamber, ports in said body serving respectively as main and by-pass outlets from said inlet chamber, movable guide means disposed in said outlets, a valve secured to said guide means and movable with the latter to control the passage of fluid through the main outlet, a second valve movable on said movable guide means for controlling the passage of fluid through the by-pass outlet, said second valve moving within said by-pass outlet to effect closure thereof, means for normally biasing the main outlet valve to closed position and the by-pass valve to open position, and thermally responsive means for opening the main outlet valve and for closing the by-pass valve against the action of the biasing means when the temperature of the fluid flowing under pressure entering the inlet rises above a predetermined value, said biasing means further permitting opening of the by-pass valve by motion independently of the main outlet valve through and beyond said by-pass outlet when the pressure differential on opposite sides of said by-pass valve exceeds a predetermined value.

3. In a fluid control valve, a body having an inlet chamber, ports in said body serving respectively as main and by-pass outlets from said inlet chamber, a control valve assembly in said chamber comprising a thermostat and first and second valves operable thereby and respectively controlling said main and by-pass outlets, said second valve being movable into said by-pass outlet to effect closure thereof and being movable relative to said thermostat, said thermostat engaging said valves and expanding under rising fluid temperature to move said first valve toward open position and said second valve toward closed position with respect to the outlets controlled thereby, said second valve being movable out of operative engagement with said thermostat through and beyond said by-pass outlet to open said by-pass outlet in response to a pressure increase in said chamber irrespective of the temperature of the fluid, and a spring for yieldingly holding said second valve in operative engagement with said thermostat and for restoring said thermostat to unexpanded condition and said first and second valves respectively to closed and open positions as the temperature of the fluid entering said inlet chamber decreases.

4. In a fluid control valve, a body having an inlet chamber, ports in said chamber serving respectively as main and by-pass outlets from said chamber, a valve assembly in said chamber including first and second valves respectively controlling said main and by-pass outlets, said second valve being movable into said by-pass outlet to effect closure thereof, means responsive to a changing condition of the fluid entering said chamber for opening and closing said valves, said second valve being movable out of said by-pass outlet to effect opening thereof in response to a predetermined pressure differential on opposite sides of said valve, and a spring acting on said valve assembly to resist pressure responsive motion of said second valve out of said by-pass outlet and to define a normal position for said valve assembly.

5. In a fluid control valve, a body having an inlet chamber, ports in said body serving respectively as main and by-pass outlets from said inlet chamber, a control assembly in said chamber comprising a thermostat and first and second valves operable thereby and respectively controlling said main and by-pass outlets, said thermostat engaging said valves and expanding under rising fluid temperature to move said first valve toward open position and said second valve toward closed position with respect to the outlets controlled thereby, a mounting for said second valve permitting motion thereof under fluid pressure out of operative engagement with said thermostat in a direction to open said by-pass outlet, and a single spring acting on said control assembly yieldingly to maintain said second valve in operative engagement with said thermostat and to return said thermostat to an unexpanded condition and said first and second valves respectively to closed and open position.

HAROLD CRUZAN.
EDWARD C. WARRICK.

REFERENCES CITED

The following references are of record in the file of this patent:

UNITED STATES PATENTS

| Number | Name | Date |
| --- | --- | --- |
| 1,223,078 | Lammert | Apr. 17, 1917 |
| 1,564,504 | Woolson | Dec. 8, 1925 |
| 2,275,576 | Ware | Mar. 10, 1942 |
| 2,265,586 | Vernet | Dec. 9, 1941 |
| 2,353,577 | Magrum | July 11, 1944 |

FOREIGN PATENTS

| Number | Country | Date |
| --- | --- | --- |
| 419,023 | Ger. | Sept. 26, 1925 |
| 421,900 | Brit. | Jan. 2, 1935 |